(12) United States Patent
Linde et al.

(10) Patent No.: US 12,628,737 B2
(45) Date of Patent: May 19, 2026

(54) BROKEN PADDLE DETECTION SYSTEM FOR ELEVATOR OF COMBINE HARVESTER

(71) Applicant: CNH Industrial America LLC, New Holland, PA (US)

(72) Inventors: Karl Linde, Leola, PA (US); Shaun O'Donnell, Quarryville, PA (US); Clayton Banks, Jr., Brownstown, PA (US)

(73) Assignee: CNH Industrial America LLC, New Holland, PA (US)

( * ) Notice: Subject to any disclaimer, the term of this patent is extended or adjusted under 35 U.S.C. 154(b) by 589 days.

(21) Appl. No.: 18/100,021

(22) Filed: Jan. 23, 2023

(65) Prior Publication Data

US 2024/0244997 A1      Jul. 25, 2024

(51) Int. Cl.
A01D 41/127          (2006.01)

(52) U.S. Cl.
CPC ....... A01D 41/127 (2013.01); A01D 41/1274 (2013.01)

(58) Field of Classification Search
CPC .......................... A01D 41/127; A01D 41/1274
See application file for complete search history.

(56) References Cited

U.S. PATENT DOCUMENTS

| | | |
|---|---|---|
| 5,561,250 A | 10/1996 | Myers |
| 6,115,115 A | 9/2000 | Skarie et al. |
| 8,635,840 B2 | 1/2014 | Behnke |
| 9,295,197 B1 | 3/2016 | Veikle et al. |

| | | | |
|---|---|---|---|
| 2010/0285855 A1* | 11/2010 | Chervenka | A01D 41/1275 |
| | | | 460/119 |
| 2013/0158816 A1* | 6/2013 | Murray | A01F 12/448 |
| | | | 701/50 |
| 2019/0352141 A1* | 11/2019 | Schedl | B66B 27/00 |
| 2020/0281118 A1* | 9/2020 | Garrett | A01D 41/1271 |
| 2021/0013072 A1* | 1/2021 | Peng | H01L 21/67288 |
| 2021/0120842 A1* | 4/2021 | Arensmeier | G08B 21/182 |
| 2021/0276832 A1* | 9/2021 | Brestensky | B66B 25/006 |
| 2022/0377977 A1 | 12/2022 | Somers et al. | |
| 2026/0020522 A1* | 1/2026 | Vandike | A01D 41/127 |

FOREIGN PATENT DOCUMENTS

| | | |
|---|---|---|
| EP | 3366613 A1 | 8/2018 |
| WO | 2022040724 A1 | 3/2022 |
| WO | 2022147607 A1 | 7/2022 |

OTHER PUBLICATIONS

The Extended European Search Report issued Jul. 15, 2024, by the European Patent Office in corresponding European Patent Application No. 24 153 546.7. (8 pages).
"Position Sensor", Wikipedia, https://en.wikipedia.org/wiki/Position_sensor, downloaded from the internet Jan. 2, 2023, 2 pages.

* cited by examiner

*Primary Examiner* — Joseph M Rocca
*Assistant Examiner* — Douglas J Meislahn
(74) *Attorney, Agent, or Firm* — Buchanan Ingersoll & Rooney PC

(57)          ABSTRACT

A system for detecting a broken or missing grain paddle of an elevator of a combine harvester includes a sensor positioned to either directly or indirectly detect a presence of grain paddles of the elevator, and output signals based thereon. The system also includes a controller that is configured to receive the signals output from the sensor and determine the occurrence of the broken or missing grain paddle as a function of the signals transmitted by the sensor.

6 Claims, 3 Drawing Sheets

BROKEN PADDLE DETECTION SYSTEM FOR ELEVATOR OF COMBINE HARVESTER

FIELD OF THE INVENTION

The present invention relates to agricultural vehicles, such as combine harvesters. More specifically, the present invention relates to a system for detecting a broken or missing paddle of a clean grain elevator of a combine harvester.

BACKGROUND OF THE INVENTION

As is described in U.S. Pat. No. 9,295,197 to CNH America LLC (the '197 Patent), which is incorporated by reference in its entirety and for all purposes, combines are used to harvest agricultural crops such as corn, soybeans, wheat and other grain crops. As the combine is driven through crop fields, the combine cuts the crop, separates the desired crop from the undesired waste, stores the crop, and discards the waste.

In a typical combine, a header is mounted to the front of the combine to gather the crop and feed the crop into the combine for processing. As the combine is driven through the field, the crop material is collected by the header and deposited into a feeder housing. The crop material is then transported upwardly and into the combine by the feeder housing. The crop material then passes through a threshing and separating mechanism. In a rotary combine, the threshing and separating mechanism includes a rotor, a threshing concave, a rotor cage, and a separating grate. As crop material passes between the rotor, the threshing concave and the separating grate, the crop material is impacted and/or rubbed, thereby causing the grain to separate from the stalk material. The stalk material that is separated from the grain is commonly referred to as material other than grain (MOG). Other types of combines are also known that perform similar functions using different mechanisms.

After passing through the threshing and separating assembly, the grain and MOG are deposited onto a grain cleaning system. The grain cleaning system of a typical combine includes a plurality of adjustable cleaning sieves, often referred to as a chaffer sieve and a shoe sieve. The sieves are typically reciprocated back and forth in opposite directions along an arcuate path. This motion has the tendency to separate the grain from the MOG. To further separate the grain from the MOG, a cleaning fan or blower is positioned so as to blow air up through the cleaning sieves. This flow of air tends to blow the MOG, which is typically lighter than grain, rearwardly and out the back of the combine. Grain, which is heavier than MOG, is allowed to drop through the openings in the sieve.

The clean grain that falls through the cleaning sieves is deposited on a collection panel positioned beneath the cleaning sieves. The collection panel is angled so as to permit the grain to flow, under the influence of gravity, into an auger trough positioned along the lowermost edge of the collection panel. The auger trough is typically positioned near the forward end of the cleaning sieves and extends along the width of the sieves. The grain collected in the auger trough is then moved by an auger towards the side of the combine where it is raised by a clean grain elevator and deposited into a grain storage tank.

The grain elevator includes a chain that moves in a continuous loop and a series of paddles that are attached to the chain. The paddles deliver the grain from the auger trough to the grain storage tank. If one of the paddles were to break, then the next paddle moving in the loop would be forced to deliver twice the amount of grain, which could stress that next paddle due to the higher grain load, causing that paddle to break.

In view of the aforementioned challenges, it would be desirable to rapidly and automatically identify a broken or missing paddle in order to limit further damage to the clean grain elevator.

SUMMARY OF THE INVENTION

According to one aspect of the invention, a system for detecting a broken or missing grain paddle of an elevator of a combine harvester includes a sensor positioned to either directly or indirectly detect a presence of grain paddles of the elevator, and output signals based thereon. The system also includes a controller that is configured to receive the signals output from the sensor and determine the occurrence of the broken or missing grain paddle as a function of the signals transmitted by the sensor.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Figure 1:
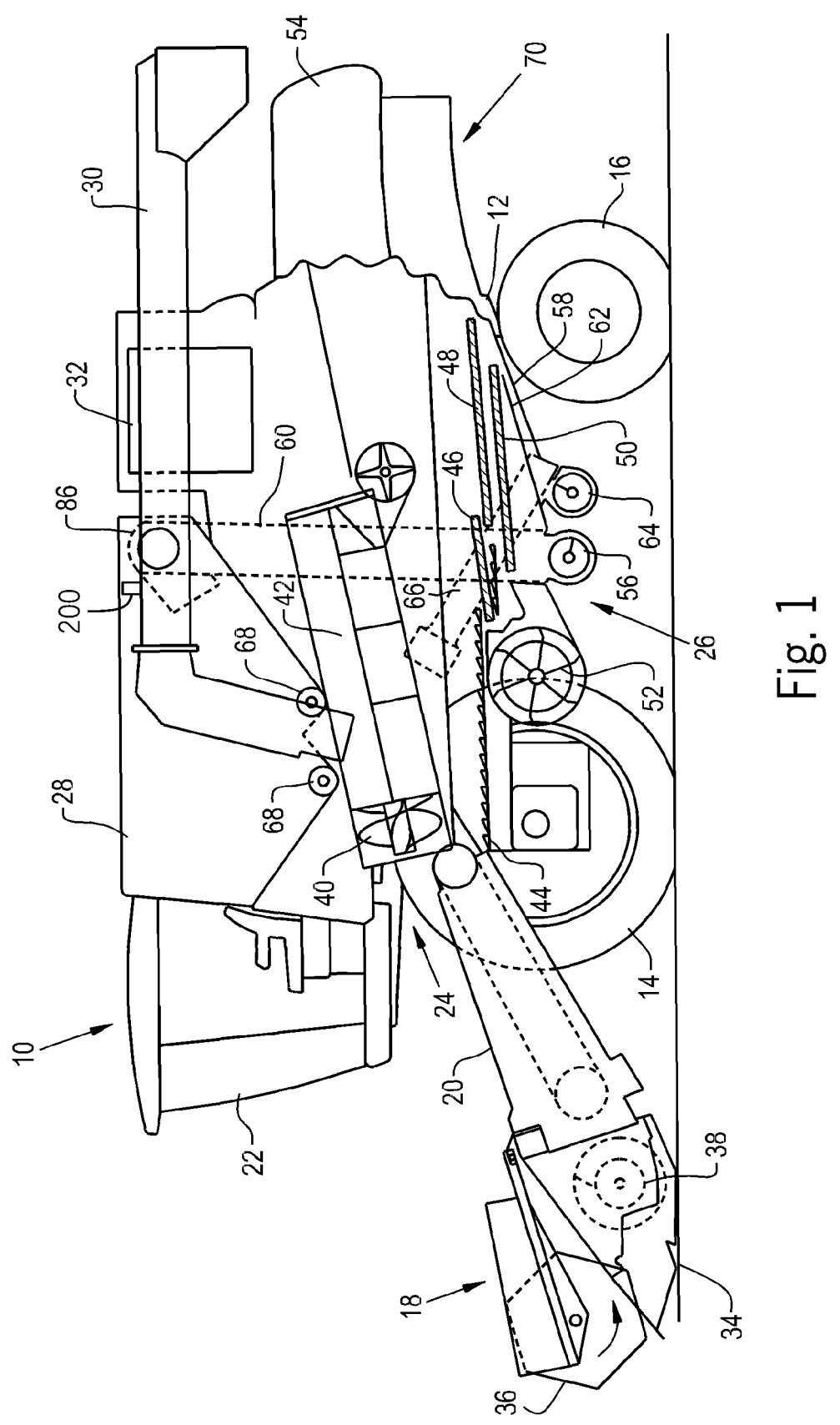
FIG. 1 is a perspective view of an embodiment of an agricultural harvester according to the present invention.

It is noted that the figures depict the elements in schematic form and are not necessarily to scale.

DETAILED DESCRIPTION OF THE INVENTION

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

As is described in the '197 Patent, referring now to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30. Motive force is selectively applied to front wheels 14 through a power plant in the form of a diesel engine 32 and a transmission (not shown).

It should be appreciated that while the agricultural harvester is shown as combine 10, the agricultural harvester according to the present invention can be any type of construction that allows for crop material to be harvested such as a conventional combine (which does not have a rotor), rotary combine, hybrid combine, chopper harvester, etc.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a shoe sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 62 of cleaning system 26. Clean grain auger 56 conveys the clean grain laterally to a generally vertically arranged elevator 60, which can also be referred to as a grain elevator, for transport to grain tank 28. Tailings from cleaning system 26 fall to a tailings auger on bottom pan 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

The non-grain crop material proceeds through a residue handling system 70. Residue handling system 70 may include a chopper, counter knives, a windrow door and a residue spreader.

Figure 2:
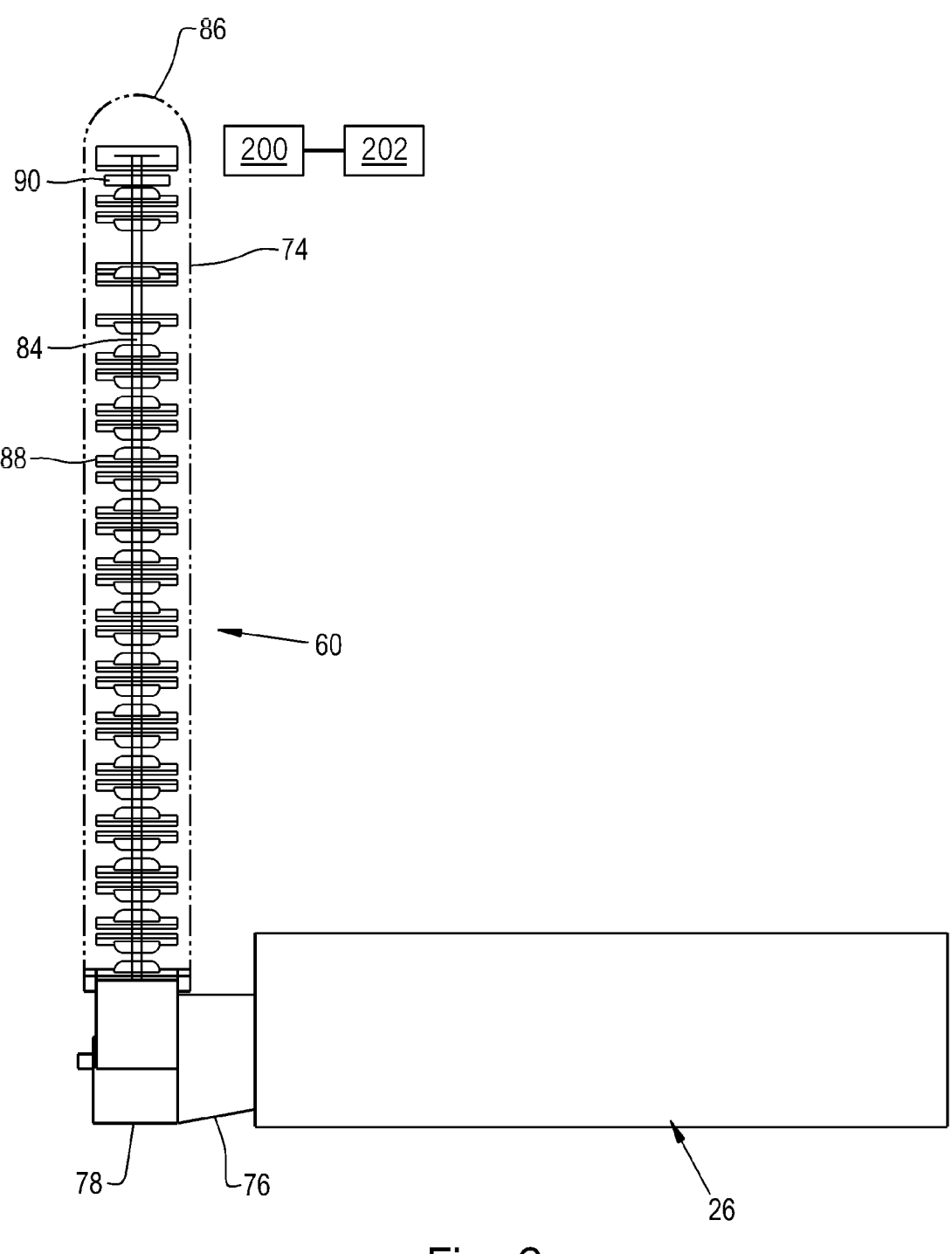
FIG. 2 is a cutaway perspective view of a portion of the agricultural harvester shown in FIG. 1, showing a portion of a cleaning system and elevator.
Figure 3:
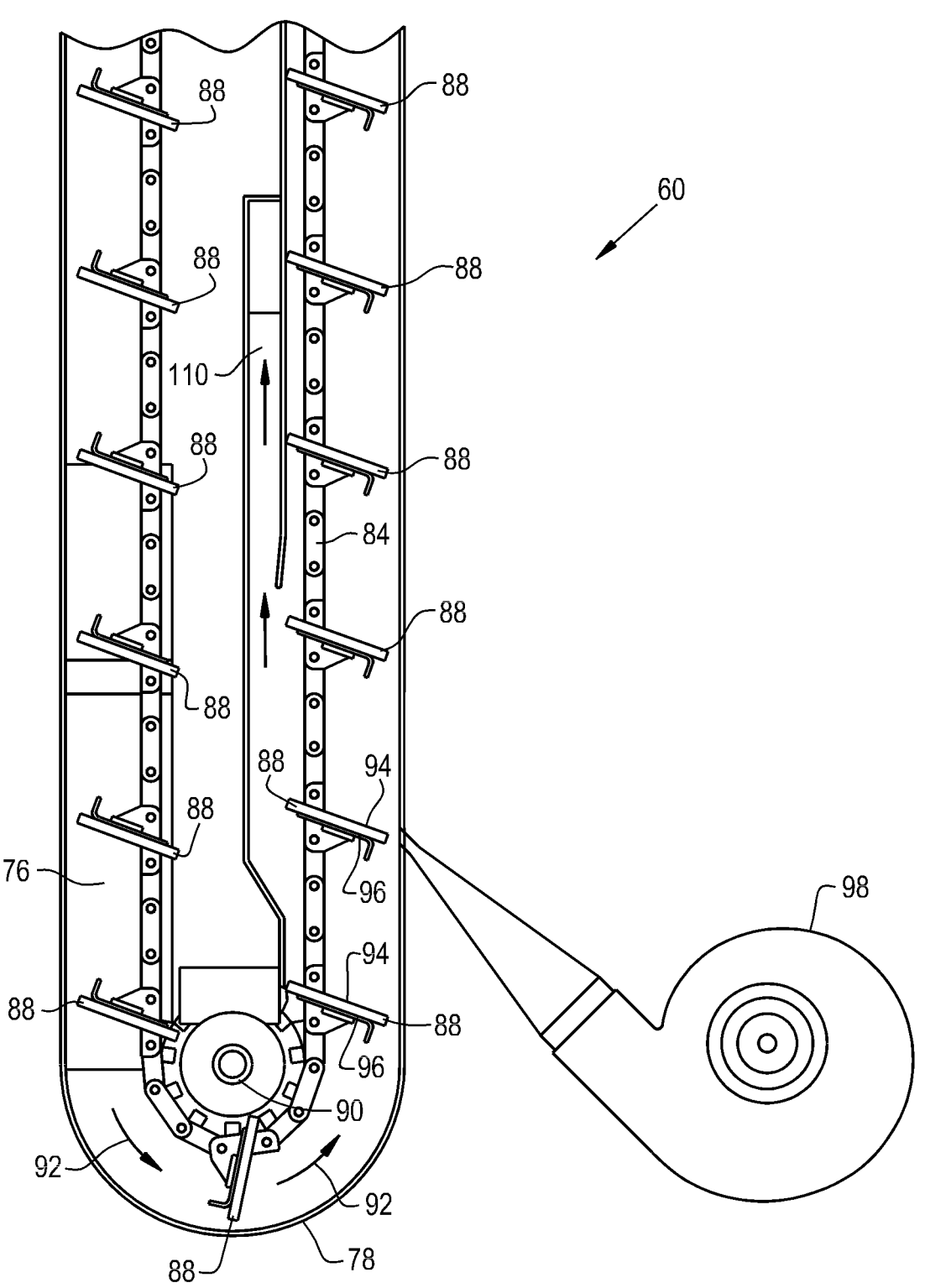
FIG. 3 is a sectional view of an embodiment of the elevator shown in FIG. 2.

Turning now to FIGS. 2 and 3, a portion of the agricultural harvester 10 with the cleaning system 26 and elevator 60 is shown in better detail. As can be seen, crop material is supplied to the elevator 60 through the cleaning system 26, which is shown generically as a block to illustrate that any sort and portion of a cleaning system could supply crop material to the elevator 60. When the cleaning system 26 shown in FIG. 1 supplies crop material to the elevator 60, the crop material can be supplied to the elevator 60 utilizing clean grain auger 56. It should be appreciated that the elevator 60 can be supplied with crop material from more than one auger or a mechanism besides an auger, depending on the configuration of the cleaning system.

The elevator 60 includes a housing 74 with a crop material inlet 76 supplied with clean grain from the cleaning system 26 and a boot portion 78 that forms a bottom of the housing 74. A driving loop 84, shown here as a drive chain, is held within the housing 74 and extends from the boot portion 78 of the housing 74 toward a top 86 of the housing 74. Although the driving loop 84 is shown as being a drive chain, which can also be referred to as an endless chain, the driving loop 84 could also be a belt, a cable, or other similar construction that forms a loop through the housing 74 and can be driven to rotate throughout the housing 74. Paddles 88 are connected to the driving loop 84, which can be driven by sprockets 90 to move the paddles 88 through the housing 74 along the driving loop 84 and convey clean grain from the crop material inlet 76 to the top 86 of the housing 74, where the crop material can be unloaded to the grain tank 28.

The paddles 88 rotate about the lower sprocket 90 in a counter-clockwise direction, indicated by arrow 92. In this sense, the paddles 88 each have a leading edge 94 which the crop material will rest on during vertical transport up the elevator 60 and a lagging edge 96 that is a bottom of the paddles 88. FIG. 3 depicts an optional air blower 98 and corresponding air flow channels 110. Blower 98 and channels 110 may be omitted, if so desired.

It should be understood that the components of combine 10 are not limited to that which is shown and described and may vary considerably.

Turning back to the background section, the paddles 88 deliver the grain from the auger trough of the clean grain auger 56 to the grain storage tank 28. If one of the paddles 88 were to break, then the next paddle 88 moving in the loop 84 would be forced to carry twice the amount of grain, which could stress that paddle 88 due to the higher grain load. The higher grain load could cause that paddle 88 to break, thereby further compounding the problem. Described hereinafter is a system for detecting a broken paddle 88 to avoid further damage to the machine.

FIGS. 1 and 2 depict a sensor 200 for either directly or indirectly detecting a broken or missing paddle 88. At least three different alternative sensors 200 are described hereinafter. Sensor 200 communicates with a computer/controller 202 via a wired or wireless electrical connection to identify a broken or missing paddle and alert the same to an operator.

Sensor 200 can constitute a detector emits a signal every time that a paddle 88 passes by the sensor 200 and transmits that signal to the combine computer 202. Computer 202 measures the time delay between successive signals (i.e., successive paddles). As background, the paddles are (ordinarily) evenly spaced along a running chain. In the case where a paddle is broken, the time delay between paddle detection will double or more depending on how many paddles are missing. The signal could be read as a frequency or pulse and the time between pulses increases when there is a missing paddle. The combine computer 202 will detect the abnormal time between pulses (i.e., a time delay exceeding a predetermined value) and then transmit a signal to the operator (or mission station) that a paddle 88 may be broken.

To detect the presence/absence of a physical body of an adjacent paddle 88, the detector may be an electrical, an opto-electrical, or an electronic device, for example. The detector may have an optical sensor, magnetic sensor (Hall effect sensor), infrared sensor, proximity sensor, positive contact sensor (e.g., wiper arm), etc. for detecting a paddle passing thereby. See, e.g., en.wikipedia.org/wiki/Position-_sensor, which is incorporated by reference, for various types of detectors/sensors that may constitute sensor 200.

Sensor 200 can constitute a yield sensor (i.e., force sensor or pressure sensor) that detects the force of the grain that is thrown onto a pressure plate mounted to the grain tank 28 (or other surface) as the paddles 88 release the grain at the top of the elevator head, and transmits a signal to computer 202 that is indicative of the detected force. More particularly, in operation, each paddle 88 throws an amount of grain (based on combine throughput) onto the yield sensor. Typically, each paddle 88 carries a similar amount of grain compared to the next lower paddle 88. The yield sensor determines the force or the amount of grain that impacts the sensor. In the case of a broken paddle 88, the sensor would detect an abnormally high amount of grain impacting the sensor plate due to the lower paddle moving two times or more grain. The increased force would be represented by a load frequency/pulse difference (e.g., a frequency/pulse difference exceeding a predetermined value) that can be detected by the combine computer 202. Once the combine computer 202 detects the out-of-specification frequency/pulse difference, it transmits a signal to the operator that a paddle 88 may be broken.

As an alternative to detecting if/when the frequency/pulse difference exceeds a predetermined value, computer 202 can transmit a signal to the operator (or mission station) that a paddle 88 may be broken if/when a frequency/pulse is below a predetermined value or if a frequency/pulse is below an average value of the successive frequency/pulses.

As another alternative to detecting if/when the frequency/pulse difference exceeds a predetermined value, computer 202 can measure the time delay between successive force measurement signals transmitted by the yield sensor, and upon detecting an abnormal time between pulses (i.e., a time delay exceeding a predetermined value) the computer 202 can transmit a signal to the operator (or mission station) that a paddle 88 may be broken.

Sensor 200 can constitute a rotation sensor (such as a rotary sensor, a tone wheel, a rotary encoder, a Hall Effect sensor, a potentiometer, an encoder, a rotary variable differential transformer (RVDT), and so forth) that is configured to detect the rotational speed of the rotating elevator shaft (e.g., at sprocket 90) and transmit that detected speed to computer 202. The rotation sensor together with the computer would detect and identify a sudden shaft speed change (i.e., a change exceeding a predetermined value) when the grain that is carried by a lower paddle (i.e., the paddle residing below a broken paddle) is suddenly thrown off of the lower paddle when the lower paddle reaches the grain tank. The elevator shaft at sprocket 90 would experience a small and sudden load change due to the sudden reduction in the mass carried by the lower paddle carrying a heavier than normal load (due to the broken paddle). Therefore, the sudden reduction in a larger than normal load causes a small detectable change in the rotational speed of the shaft carrying the chain that carries the paddle. The rotation sensor together with the computer detects and identify the detected change in the rotational speed of the shaft (i.e., an absolute value of change exceeding a predetermined value). Once the combine computer 202 detects the out-of-specification change, it transmits a signal to the operator that a paddle 88 may be broken.

As an alternative to sensing the rotational speed or angular velocity of the shaft, the sensor 200 could be configured to sense the torque, position and/or acceleration of the shaft, and the computer 202 may be configured to identify the speed of the shaft based upon that torque, position and/or acceleration.

It is to be understood that the operational steps described herein are performed by the controller/computer 202 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 202 described herein is implemented in software code or instructions which are tangibly stored on a tangible computer readable medium. Upon loading and executing such software code or instructions by the controller 202, the controller 202 may perform any of the functionality of the controller 202 described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural vehicle comprising:
   a grain elevator including a housing and a series of interconnected grain paddles positioned within the housing that are driven in an endless loop;
   a sensor positioned to either directly or indirectly detect a presence of the grain paddles and output signals based thereon; and a controller that receives the signals output from the sensor and determines the occurrence of a broken or missing grain paddle of the interconnected grain paddles as a function of the signals transmitted by the sensor;

wherein the sensor measures a force of grain that is thrown by each grain paddle onto a measurement portion of the sensor, wherein the controller determines the occurrence of the broken or missing grain paddle when the measured force exceeds a pre-determined predetermined value, and wherein the controller alerts an operator of the system to the occurrence of the broken or missing main paddle.

2. The agricultural vehicle of claim 1, wherein the controller further determines the occurrence of the broken or missing grain paddle when a time delay between successive detected forces exceeds the predetermined value.

3. The agricultural vehicle of claim 1, wherein the sensor comprises a pressure sensor or a force sensor.

4. The agricultural vehicle of claim 1, further comprising a grain tank; wherein the sensor is mounted to a wall of the grain tank.

5. The agricultural vehicle system of claim 1, wherein the grain elevator includes a chain or a belt and the paddles are connected to the chain or the belt.

6. The agricultural vehicle of claim 1, wherein the agricultural vehicle is a combine harvester.

\* \* \* \* \*